US011712999B2

(12) United States Patent
Kang et al.

(10) Patent No.: US 11,712,999 B2
(45) Date of Patent: Aug. 1, 2023

(54) LIGHTED MIRRORS (71) Applicant: Munchkin, Inc., Van Nuys, CA (US)

(72) Inventors: Yong Sun Simon Kang, Los Angeles, CA (US); Thomas Edward Birkert, West Hills, CA (US); Mark Gerard Tebbe, Ventura, CA (US)

(73) Assignee: MUNCHKIN, INC., Van Nuys, CA (US)

( * ) Notice: Subject to any disclaimer, the term of this patent is extended or adjusted under 35 U.S.C. 154(b) by 0 days.

(21) Appl. No.: 17/852,303

(22) Filed: Jun. 28, 2022

(65) Prior Publication Data
US 2022/0410806 A1     Dec. 29, 2022

Related U.S. Application Data (60) Provisional application No. 63/215,916, filed on Jun. 28, 2021.

(51) Int. Cl.
*B60R 1/12* (2006.01)
*B60Q 3/233* (2017.01)
*B60Q 3/76* (2017.01)
*B60R 1/00* (2022.01)

(52) U.S. Cl.
CPC ............ *B60R 1/1207* (2013.01); *B60Q 3/233* (2017.02); *B60Q 3/76* (2017.02); *B60R 1/008* (2013.01)

(58) Field of Classification Search
CPC .. B60R 1/008; B60R 1/12; B60Q 3/76; B60Q 3/323
See application file for complete search history.

(56) References Cited

U.S. PATENT DOCUMENTS

| 7,222,977 B1* | 5/2007 | Darling | ................. | B60R 1/008 362/135 |
| 2003/0086191 A1* | 5/2003 | Nielsen | ................. | B60N 2/879 359/877 |
| 2008/0259475 A1* | 10/2008 | Bush | ....................... | B60R 1/008 359/872 |

OTHER PUBLICATIONS https://a.co/d/9iDCoTm Diono Easy View XXL Baby Car Mirror (Year: 2020).*

* cited by examiner

*Primary Examiner* — Anabel Ton
(74) *Attorney, Agent, or Firm* — Robert Z. Evora (57) ABSTRACT

A lighted mirror having a mirror housing that contains a mirror, a seat attachment assembly for attaching the lighted mirror to a seat in a vehicle, and a light housing that contains a light source for illuminating a child in a vehicle seat.

17 Claims, 11 Drawing Sheets

LIGHTED MIRRORS

This Patent Application claims priority to U.S. Provisional Patent Application Ser. No. 63/215,916, filed Jun. 28, 2021, the content of which is hereby incorporated by reference herein in its entirety into this disclosure.

TECHNICAL FIELD

The subject disclosure relates generally to lighted mirrors. More specifically, the subject disclosure relates to lighted mirrors commonly used to observe children in vehicle back seats.

BACKGROUND OF THE SUBJECT DISCLOSURE

The responsibility of parents to monitor their children extends well beyond the home. One very common venue where parents are often close to but nevertheless out of direct view of their children is inside a vehicle. Under current laws, infants and children are often seated in the rear seats of a vehicle, while parents are often either driving or sitting in the front passenger seat. Because a parent's back is to the children who are sitting in the back, the rear view mirror or vanity mirror, both located in the front row of a standard vehicle, are often used to monitor infants and children. However, the rear view mirror is designed as a tool for the driver to monitor external traffic, and the vanity mirror is designed to simply reflect back the face of the person sitting in the front passenger seat. Further, these two common front row mirrors were not designed for and therefore do not work well in reflecting what is happening in the back seats to the front seat driver or passenger, especially under dark conditions (evening or nighttime, tunnels, garages, vehicle washes, storms, etc.). In such cases, even if a parent is able to see the child seated in the back, the dark conditions do not allow a clear image of the face of the child.

SUMMARY OF THE SUBJECT DISCLOSURE

The subject disclosure relates generally to vehicle seat mirrors that a driver or front seat passenger may use to view a child seated in a back row. Further, for vehicles that have multiple rows of seats, the subject disclosure may be used to view any child sitting in a row behind the observer's row. For example, a standard mirror may be placed on the back of the driver's headrest to be able to observe a child in a third row as viewed by a passenger in the second row sitting behind the driver and facing the mirror. In the example and description herein, for sake of simplicity, reference is made to a driver who is observing a child seated in a second row, but one having ordinary skill in the art can appreciate that the subject disclosure may be used to observe any person, animal, or object who is in a position which is one or more rows behind the observer. For example, a front row passenger may use the subject disclosure to observe the face of a sick pet laying down on a back seat of the vehicle during a vehicle ride to the veterinarian.

Lighted vehicle seat mirrors according to the present subject disclosure attach to various seats in the vehicle and face the child that is secured in a vehicle seat, and offer the driver a clear, lighted, and glare-free view of the child through a line of sight established from the rear-view mirror (or any standard mirror) to the lighted vehicle seat mirror. One or more strategically positioned light sources illuminate the child's face just enough to allow the parent a clear and lighted view, without creating a glare for the child/parent, or disturbing the child.

In one exemplary embodiment, the present subject disclosure is a light mirror in a vehicle. The lighted mirror includes a mirror housing containing a mirror: a light housing disposed in the mirror housing and containing a light source, wherein the light housing directs light below a central axis of the mirror: and an attachment assembly for securing the lighted mirror to a headrest in a vehicle.

In another exemplary embodiment, the present subject disclosure is a light mirror in a vehicle. The lighted mirror includes a mirror housing containing a mirror; a light housing disposed at a bottom portion of the mirror housing and containing a light source, wherein the light housing directs the light source angularly downward such that any light would be emitted below a center point of reflection of the mirror; and an attachment assembly for securing the lighted mirror to a headrest in a vehicle.

In yet another exemplary embodiment, the present subject disclosure is a light mirror in a vehicle. The lighted mirror includes a mirror housing containing a mirror; a light housing disposed at a bottom portion of the mirror housing and containing a light source, wherein the light housing directs light below a central axis of the mirror such that any light would be emitted below a center point of reflection of the mirror; and an attachment assembly for securing the lighted mirror to a headrest in a vehicle, the attachment assembly having a pan& with a post, which mates with a recess in the mirror housing, and further including adjustable straps connected to the panel.

BRIEF DESCRIPTION OF THE DRAWINGS

Various exemplary embodiments of this disclosure will be described in detail, wherein like reference numerals refer to identical or similar components or steps, with reference to the following figures, wherein.

DETAILED DESCRIPTION OF THE SUBJECT DISCLOSURE

Particular embodiments of the present subject disclosure will now be described in greater detail with reference to the figures.

The subject disclosure is described with reference to the drawings, wherein like reference numerals are used to refer to like elements throughout. In the following description, for purposes of explanation, numerous specific details are set forth in order to provide a thorough understanding of the present disclosure. It may be evident, however, that the present disclosure may be practiced without these specific details.

Figure 1A:
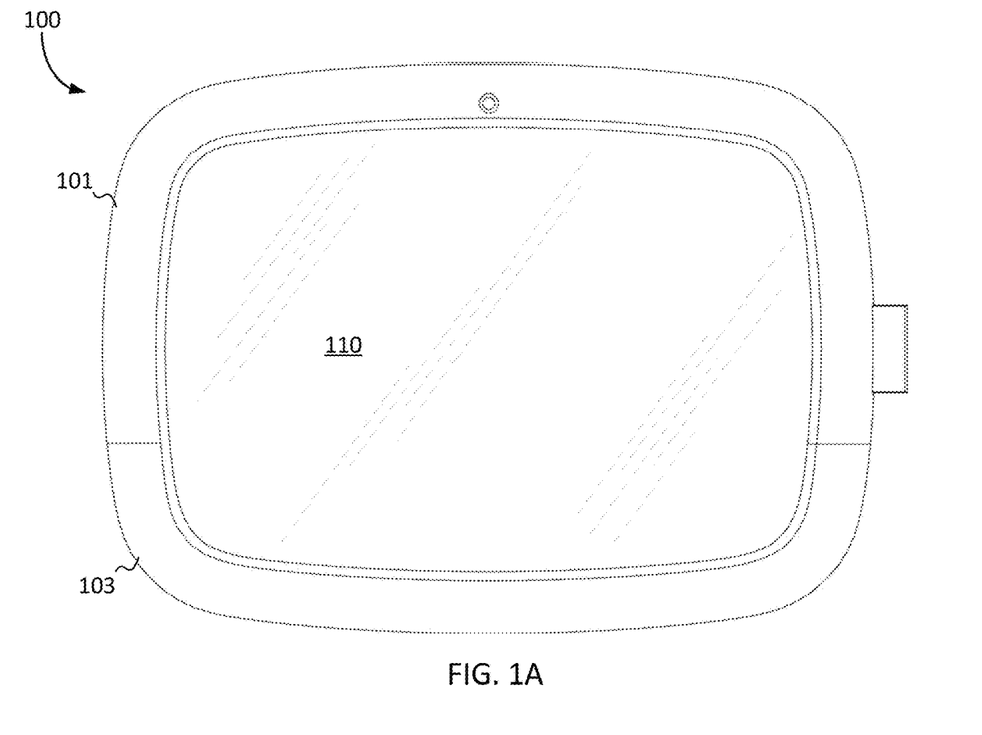
FIG. 1A is a front view of a lighted mirror, according to an exemplary embodiment of the present subject disclosure.

FIG. 1A is a front view of a lighted mirror device 100, according to an exemplary embodiment of the present subject disclosure. The lighted mirror device 100 has a mirror housing comprising an upper positioned front frame portion 101 and lower positioned light housing portion 103. As viewed from the front, a mirror 110 is framed by the upper frame portion 101 and lower light housing portion 103.

Figure 1B:
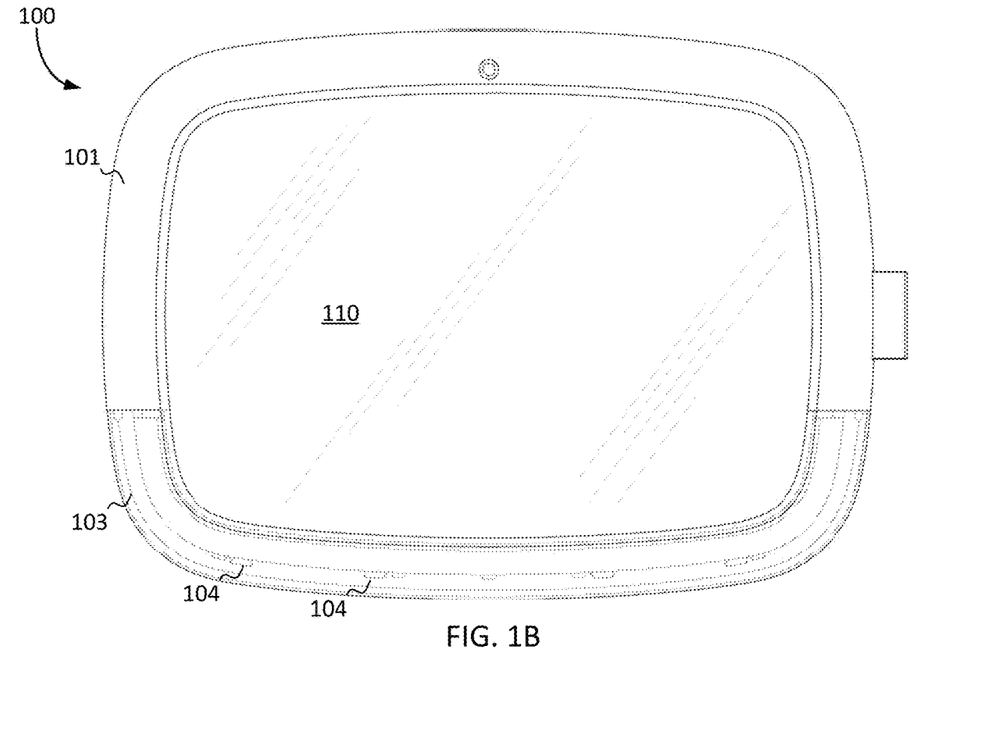
FIG. 1B is a front view of a lighted mirror with lighting cover removed, according to an exemplary embodiment of the present subject disclosure.

As shown in FIG. 1B, the light housing 103 is disposed at a lower end of the mirror housing 101 and contains the one or more light sources 104. The light housing 103 may be transparent or translucent for allowing light to transmit through the light housing 103. Alternatively, the light housing 103 may be opaque with a light filter for allowing some of the light generated by the one or more light sources 104 to transmit thereout. As shown in the figures, the light sources 104 may be a light-emitting diode (LED), which is a semiconductor diode that glows when a voltage is applied. The one or more LEDs may be the same color or multi-colored, with variable intensities.

Figure 2:
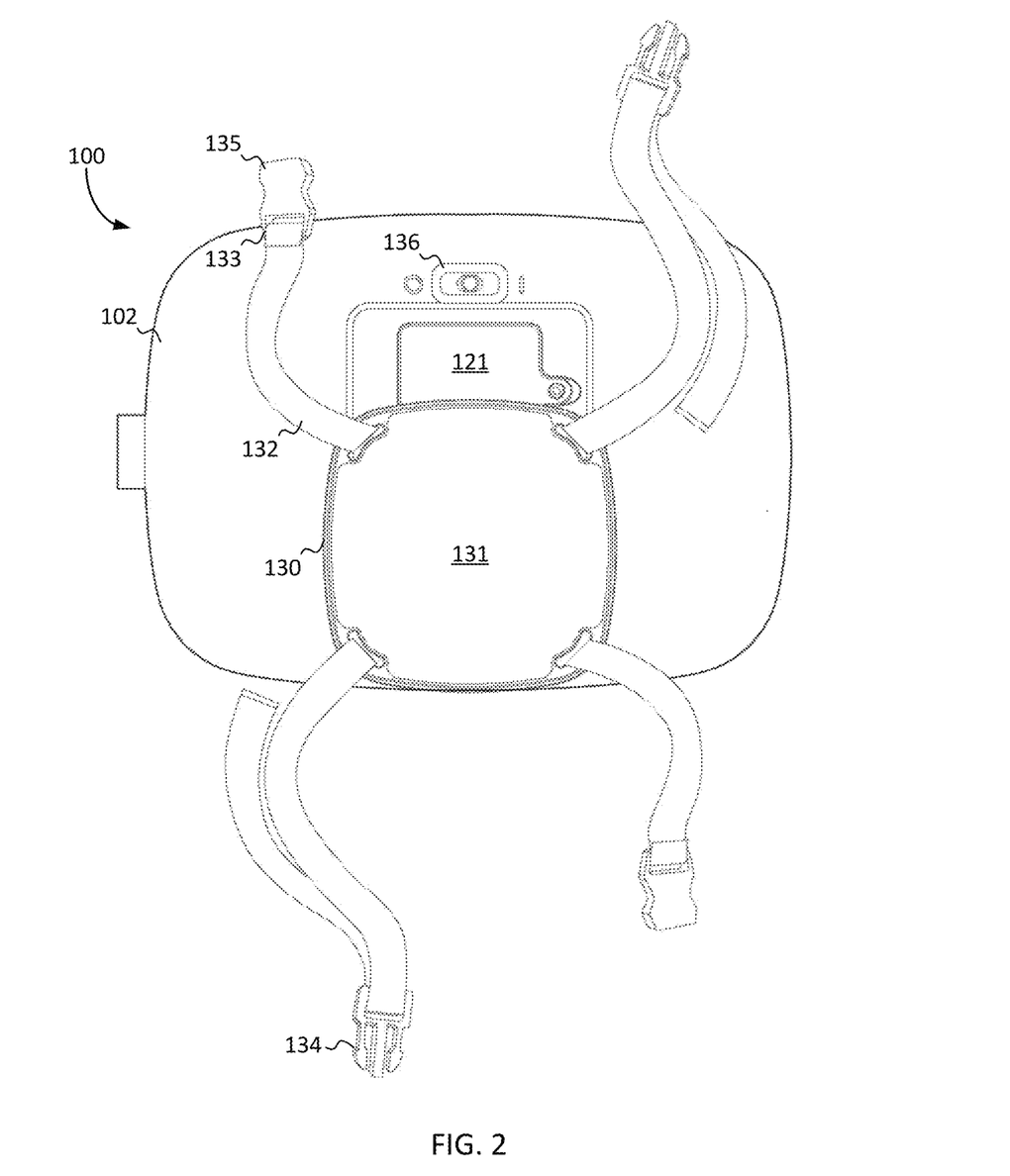
FIG. 2 is a rear view of a lighted mirror, according to an exemplary embodiment of the present subject disclosure.

FIG. 2 shows back side view of the lighted mirror device 100, according to an exemplary embodiment of the present subject disclosure. A power source may be a battery, or a plurality of batteries. The batteries may be received and secured in the battery housing 121 disposed on the mirror back housing 102. A seat attachment assembly 130 may be coupled to the mirror back housing 102.

The seat attachment assembly 130 may include a panel 131 at least one strap 132. In the example shown, the seat attachment assembly 130 includes four straps 132 with adjustable lengths. The straps 132 may include buckles 133 that are snap-fit and disposed at the ends of the straps 132 for securing the straps together in order to secure the panel 131 to the head rest of the vehicle seat. The buckles 133 include a male member 134 having a hook end and a female member 135 having an insertion frame. In the example shown in FIG. 2, two of the straps 132 have the male member 134 and the other two straps 132 have the female member 135. Other securing devices may also be used, and are within the purview of one having ordinary skill in the art. Examples include, but are not limited to, hook and loop (VELCRO), buttons, belt-style projection and holes, and other known mechanisms in the art. A power on/off switch 136 allows the user to power on or off the device 100.

Figure 3A:
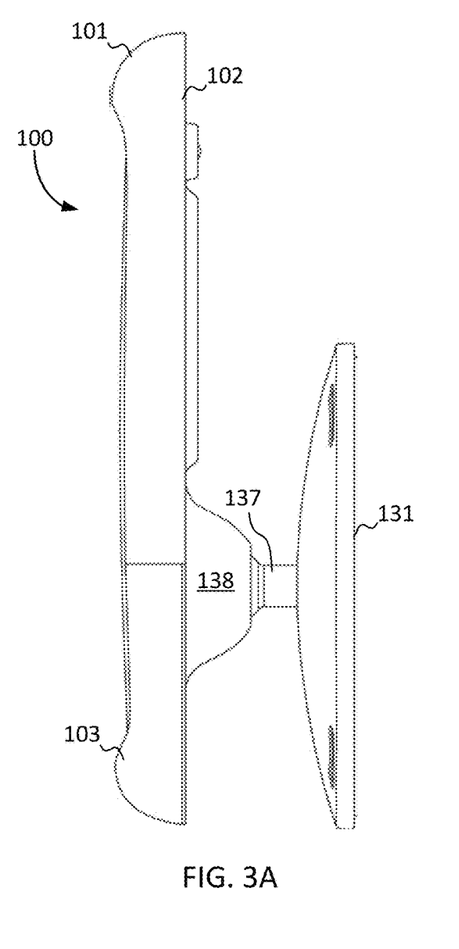
FIG. 3A is a side view of a lighted mirror, according to an exemplary embodiment of the present subject disclosure.
Figure 3B:
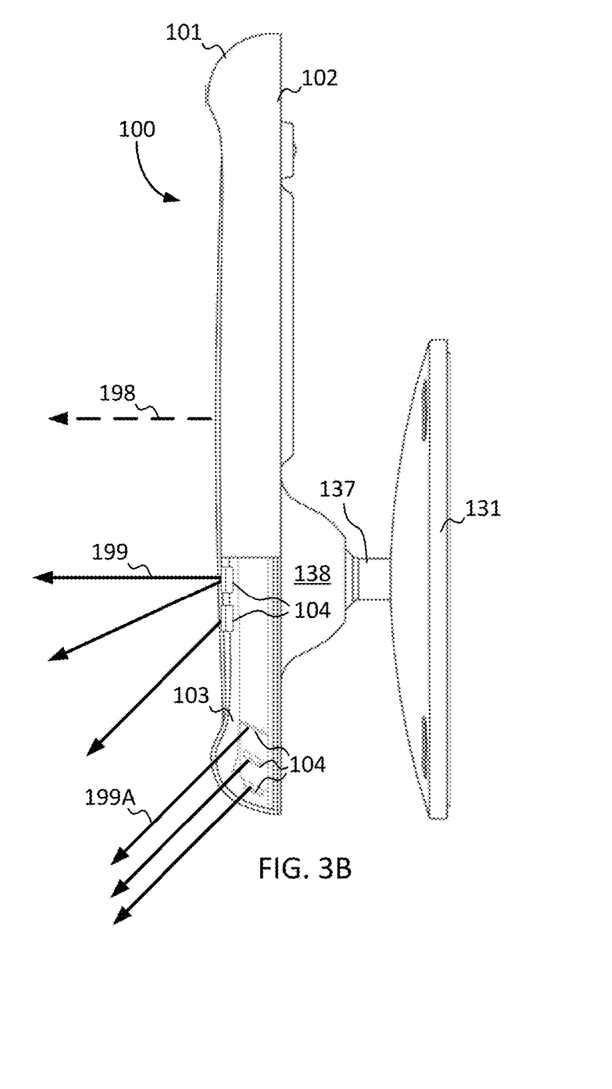
FIG. 3B is a side view of a lighted mirror with lighting cover removed, according to an exemplary embodiment of the present subject disclosure.

FIGS. 3A-3B show a side view of the lighted mirror 100 with the light housing 103 in place (FIG. 3A) and removed (FIG. 3B), respectively. FIGS. 3A-3B show the panel 131 coupled to the mirror back housing 102. The panel 131 may include a post 137 disposed on one face that fits within a complementary post recess 138 disposed on the mirror back housing 102 in a ball-joint configuration. The post recess 138 may include a locking feature, such as a tightening ring for securing the post therein.

Figure 4:
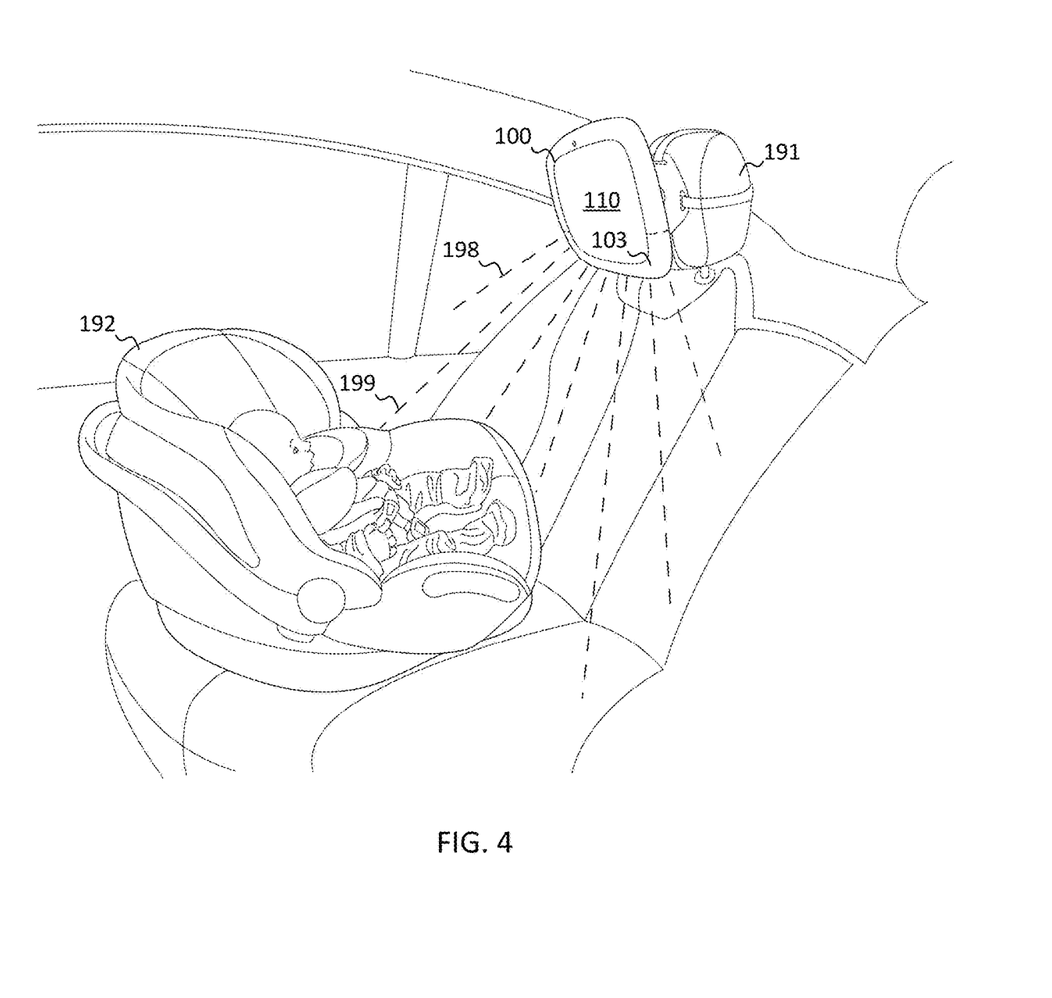
FIG. 4 is a perspective view of a child in a vehicle seat facing the lighted mirror that is installed on a vehicle seat, according to an exemplary embodiment of the present subject disclosure.

FIG. 4 is a side perspective view of the lighted mirror 100 in use. In operation, the lighted mirror 100 may be attached to various locations, including, for example, the back side of a headrest 191 of a vehicle. The mirror 100 may be used by parents or drivers to maintain a constant visual contact with an infant, toddler or child strapped into, for example, a car seat 192, which may be facing the front or rear of the vehicle. The parent or driver can position the lighted mirror 100 so that there is a reflected line of sight between the parent and the vehicle's rear-view mirror, and the lighted mirror 100, which shows the face of the child. The lighted mirror 100 may direct light 199 onto or around the child to illuminate the child in the dark. Light that is not directed, modulated, or corrected by the light housing 103 may cause shadows that render the child unviewable to a driver at night. Undirected light may also cause a bright glare in the mirror that may render the child unviewable and may distract or blind the driver. The light source of the lighted mirror 100 is directed, modulated and/or controlled in order to illuminate the child at night.

As shown in FIGS. 3B and 4, the lighted mirror 100 is designed such that the emitted light 199 is positioned below a central axis 198 of the mirror, which would be the focal point of the reflection of the face of the child in the mirror 110. Thus, any light 199 emitted from the light housing 103 would project downward below the face of the child, as shown in FIG. 4. This directed light position would allow a soft light to reflect from the light housing 103 onto the child's face without having a direct light shining and causing a glare in the eyes of the child. Furthermore, as shown in FIG. 3B, the emitted light 199A is shown illuminating outward from light sources 104 within the light housing 103. One or more emitted lights 199A may be provided in the light housing 103. The emitted light 199A is directed an angle downward from the position of each of the light sources 104 in a direction that is not in line with, and directed away from, the child's face so as not to disturb the resting child. The angle downward may be in any range at and/or below perpendicular to the central axis 198. It is understood that it is possible to integrate light sources at or above the central axis 198 according to this subject disclosure.

Figure 5:
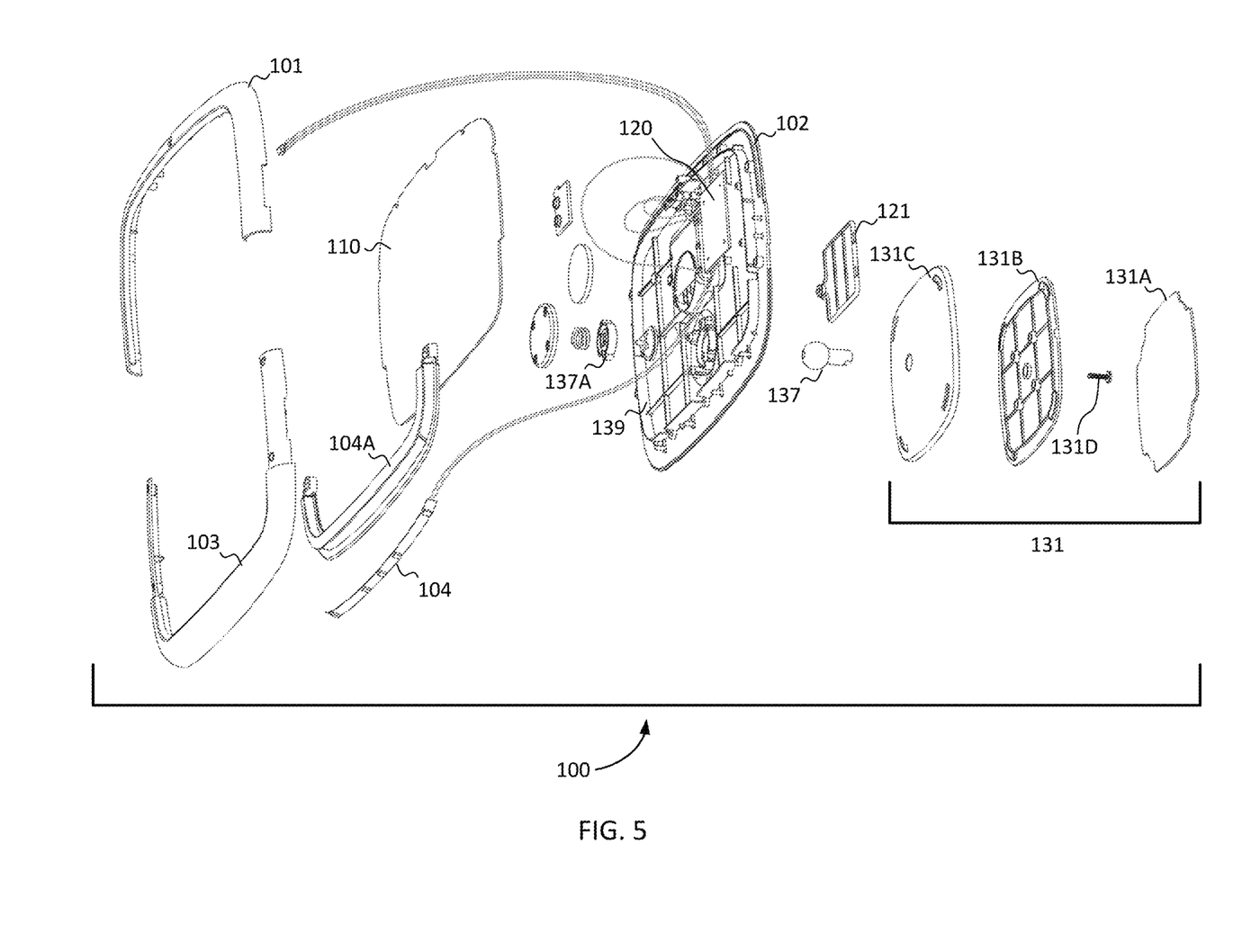
FIG. 5 is an exploded side perspective view of a lighted mirror, according to an exemplary embodiment of the present subject disclosure.

FIG. 5 is an exploded side perspective view of the lighted mirror 100. The mirror front housing may have a top portion 101 and a bottom portion 103 that encircle the mirror 110.

The bottom portion 103 of the mirror front housing may be transparent or translucent to allow light from the light housing bracket 104A or the light source 104 to shine thereout. A mirror frame may be disposed inside the mirror front housing for securing the mirror 110. The light housing 103 may also be adapted to hold the mirror 110 securely within the mirror housing. The light housing 103 may be adapted to fit within the mirror front housing. The light source 104 may be disposed in the light housing 103.

In the example shown in FIG. 5, the light source 104 is an LED strip. The battery housing 120 may include a battery door 121 for securing the batteries therein. The post 137 may extend through the mirror back housing 102 where it is secured therein by a ring 137A. The panel 131 may have a front face 131A, a middle portion 131B, and a back face 131C, which may be secured together by a screw 131D or other conventional attachment mechanisms. The interior compartment 139 may be adapted to contain the electronic components necessary to power and operate the lighted mirror 100 and may include a power switch 136, a timer, a communication transceiver for remote operation, at least one circuit having a control module, a processor and memory for the storage of user data generated and/or various lighting setting, voice commands and illumination patterns. A USB port or other port may be provided for power charging or data transmission. The lighted mirror 100 may be adapted for voice-controlled operation, and/or integration and control by a vehicle operating system.

Figure 6A:
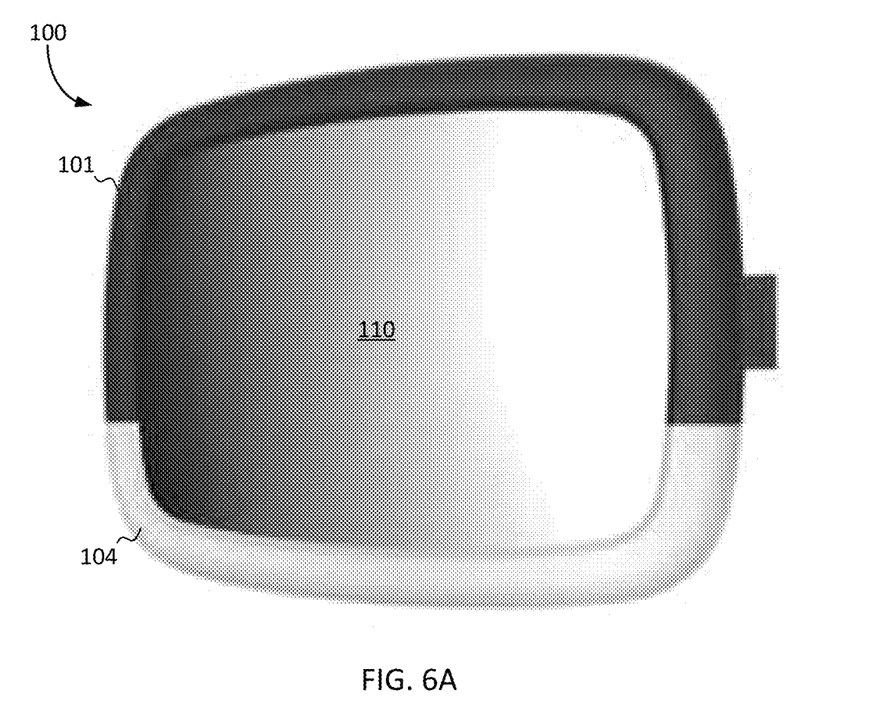
FIG. 6A is a front perspective view of a lighted mirror with a selected lighting setting, according to an exemplary embodiment of the present subject disclosure.
Figure 6B:
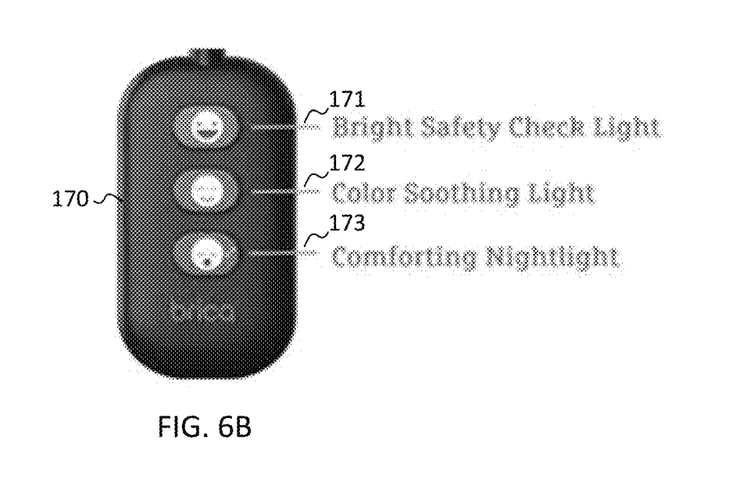
FIG. 6B is a front view of a controller, according to an exemplary embodiment of the present subject disclosure.

As shown in FIG. 6A, the lighted mirror 100 may have a light source 104 that may be adapted to display different colors or light patterns. The colors or light patterns may soothe or entertain the child while also illuminating the child so that the driver may view the child from the rear-view mirror. An exemplary remote control 170 for operating the lighted mirror 100 is shown in FIG. 6B. The controller 170 may include a bright safety check light 171 for quickly increasing the intensity of the light source in order to check on the child's condition. The controller 170 may also include a color soothing light 172 and a comforting nightlight 173.

Figure 7A:
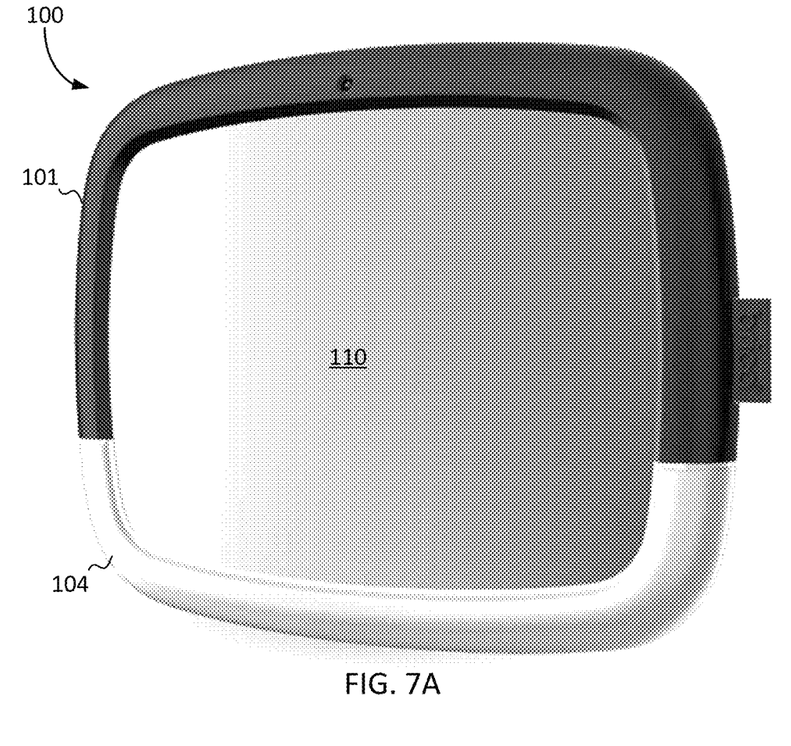
FIG. 7A is a front perspective view of a lighted mirror with a selected lighting setting, according to an exemplary embodiment of the present subject disclosure.
Figure 7B:
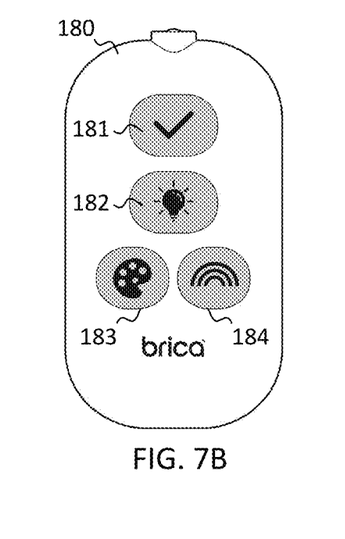
FIG. 7B is front view of another controller, according to an exemplary embodiment of the present subject disclosure.

FIG. 7A shows a lighted mirror 100 that includes a single comforting nightlight 104 that may help the child fall asleep, while also illuminating the face of the child for the driver. FIG. 7B shows an exemplary embodiment of another controller 180 for operating the lighted mirror 100. The controller 180 may be adapted to turn the light source on and off 181 or adjust the light settings 182. The intensity of the light source 183 and/or other properties 184 (color combination, etc.) of the light generated by the light source may be adjusted. Alternatively, control 181 may be a quick safety check to ensure that the child is fine. Control 182 may be an extended nightlight. Control 183 may be color selection. Control 184 may be a color spectrum (alternating colors, including soothing warm tones and energizing cool tones). The rear (not shown) of the controllers 170/180 includes a battery compartment and battery door for securing batteries therein.

Figure 8A:
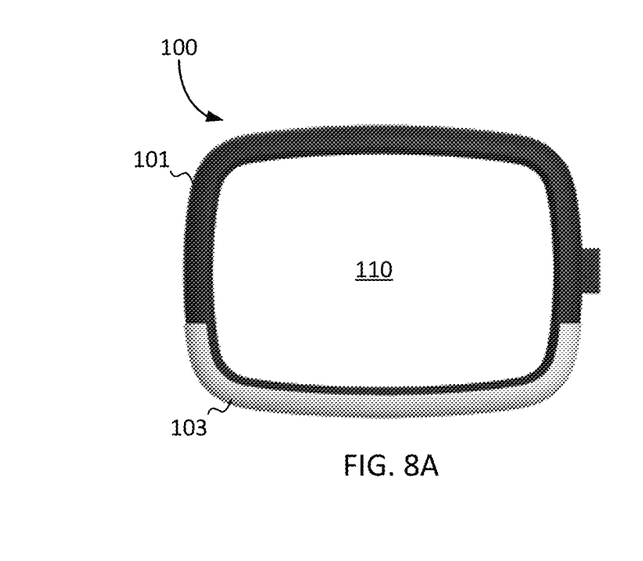
FIG. 8A is a front perspective view of a lighted mirror with a light housing attached, according to an exemplary embodiment of the present subject disclosure.
Figure 8B:
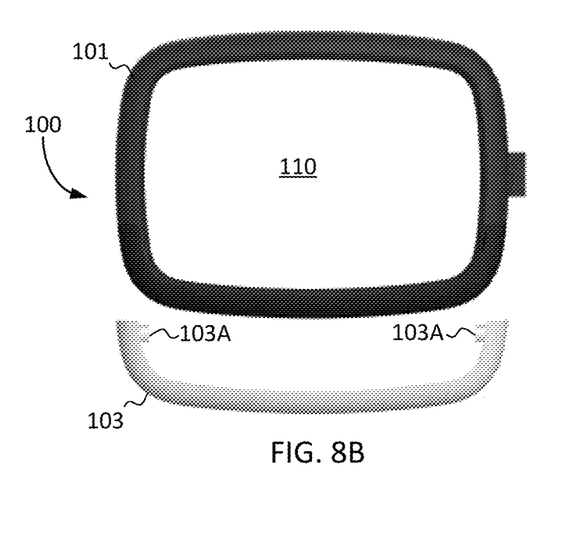
FIG. 8B is a front perspective view of a lighted mirror with a light housing detached, according to an exemplary embodiment of the present subject disclosure.

FIGS. 8A-8B show an embodiment of the lighted mirror 100 with a light housing 103 that may be pivotable and detachable. The light housing 103 may include two inwardly facing shafts 103A that are received into complementary recesses (not shown) disposed on the side of the mirror housing in order to pivot the light housing 103. The pivoting of the light housing 103 and the resulting angle of the light source may also be controlled by the controllers 170/180 via a motorized control mechanism (not shown).

Figure 9A:
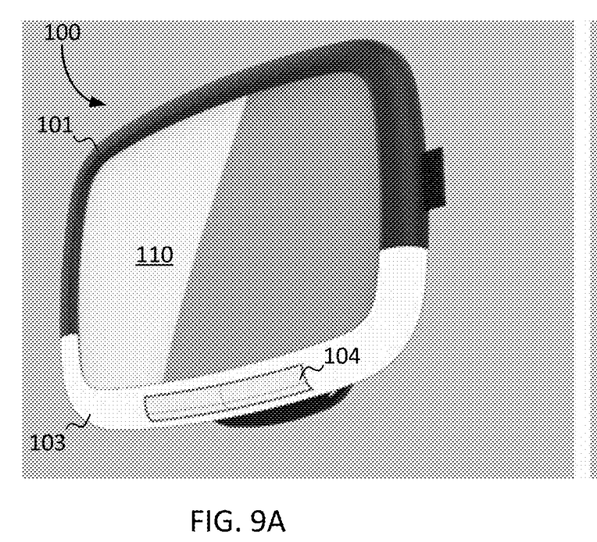
FIG. 9A is a front perspective of a lighted mirror with rotatable light source, according to an exemplary embodiment of the present subject disclosure.
Figure 9B:
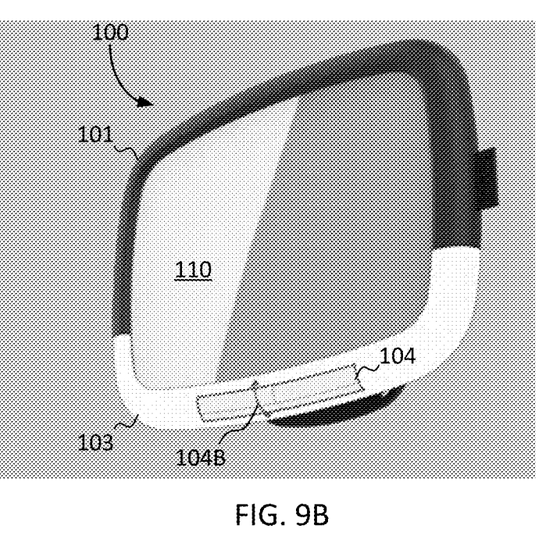
FIG. 9B is a front perspective of a lighted mirror with rotatable light source in motion, according to an exemplary embodiment of the present subject disclosure.

FIGS. 9A-9B show an embodiment of the lighted mirror 100 in which the light source 104 extends through the light housing 103. A lens may be disposed over the light source 104 in order to protect and direct the light source 104. As shown in FIG. 9B, the light source 104 (or lens covering) may be rotatable 104B so as to direct the light at different angles. An example of such a rotating light source or lens is shown in FIGS. 10A-10B.

Figure 10A:
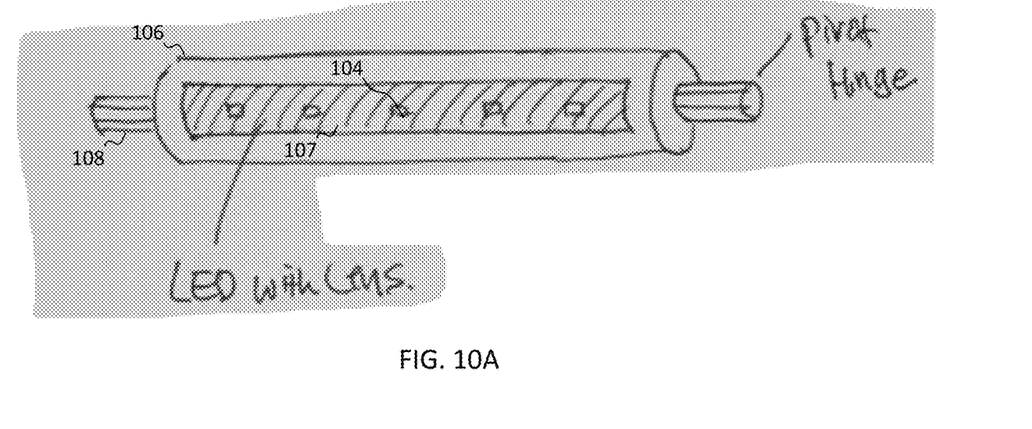
FIG. 10A is a front perspective view of a rotatable light source with lens in position, according to an exemplary embodiment of the present subject disclosure.
Figure 10B:
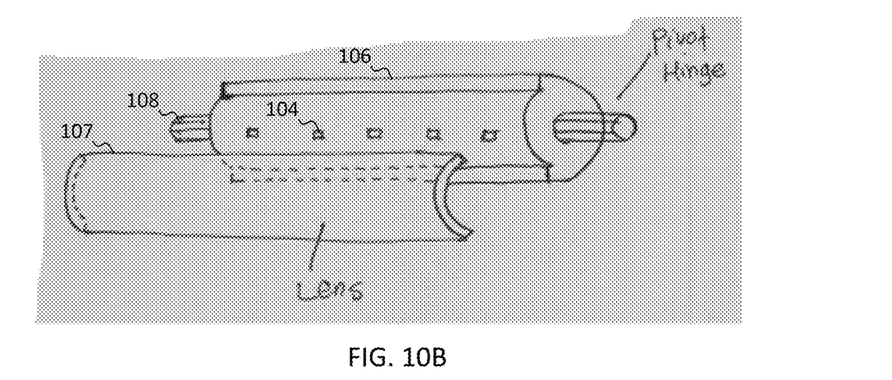
FIG. 10B is a front perspective view of a rotatable light source with lens removed, according to an exemplary embodiment of the present subject disclosure.
Figure 10C:
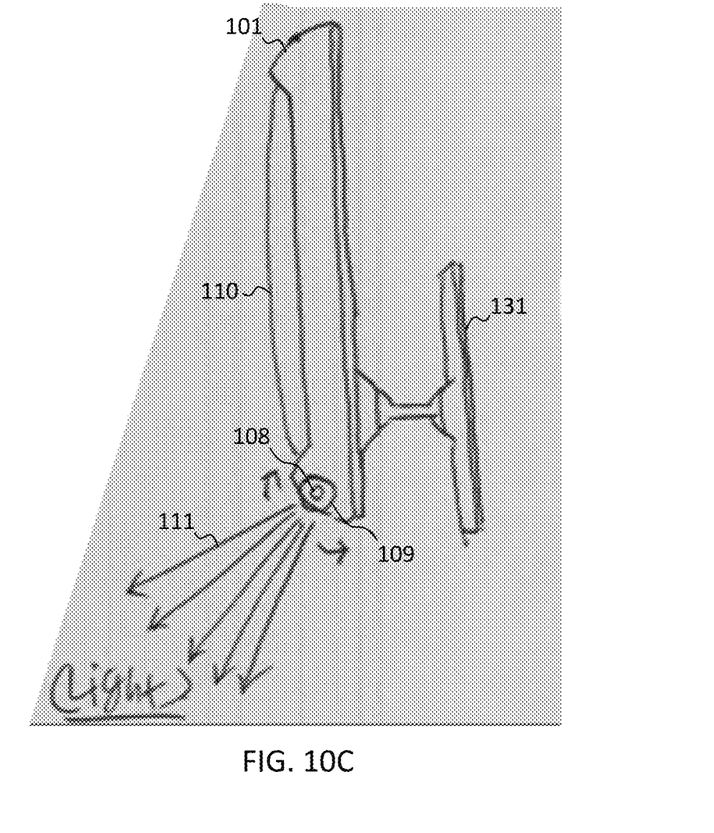
FIG. 10C is a side view of a lighted mirror with rotatable light source, according to an exemplary embodiment of the present subject disclosure.

As shown in FIGS. 10A-10C, the light source 104 may be part of a tubular light package 106 with a removable lens 107. At least one pivot hinge 108 may be received in a complementary recess 109 disposed on the light housing (FIG. 10C). In the example shown, the light source 104 has pivot hinges 108 disposed on two opposite ends. The light source 104 may fit flush within the light housing (as shown in FIGS. 10A-10C) or the light source may extend below the light housing (not shown). As shown in FIG. 10C, the light source 104 may be pivotable about the pivot hinges 108 in recess 109 in order to direct the light source 104 to illuminate the child in the vehicle seat at various angles 111.

Beyond the examples shown and described herein, there are countless variations that are within the purview of the present subject disclosure. Some examples will be described below. Others are also possible and within the purview of one having ordinary skill in the art after consideration of the present subject disclosure. For sake of brevity, not all variations have been shown, but are appreciated by one having ordinary skill in the art.

Some exemplary embodiments of the lighted mirror may be without a light housing. The front mirror housing may have light apertures disposed through the housing. The light source may shine through the light apertures in order to illuminate the child reflected in the mirror. The light source is a strip of LED lights disposed in the mirror housing. The light apertures are disposed in the bottom portion of the front mirror housing and adapted to receive the LED light source. The light apertures may be adjustable. The light apertures may partially, or completely, encircle the mirror. A single continuous LED light strip may encircle the mirror, or multiple LED light strips may be incorporated into the mirror housing.

Different light paths may be created by the light source of the lighted mirror. The mirror housing may be adjusted relative to the seat attachment assembly in order to direct the path of the light source. The angle of light source may be controlled in order to illuminate the child shown in the mirror clearly, from the perspective of the driver looking through the rear-view. The spread of the angle of the light source may be approximately 120 degrees measured from the surface of the seat to the outer boundary of the vehicle seat. The light source may be adapted to partially, or completely, illuminate the vehicle seat.

Some embodiments include a filter that may be disposed on the light housing. A series of light apertures may be disposed on the light housing in order to pass and direct the light generated from the light source disposed therein. The light housing may be transparent, translucent or opaque. The light apertures may have a given length and width. The light apertures may be disposed in rows organized vertically or horizontally. The rows may be substantially straight or may be curved along a given angle. The light apertures may be arranged in various patterns in order to maximize or optimize different characteristics of the light generated by the light source.

Another embodiment includes the filter of the light housing with the light apertures arranged in a series of horizontal rows along a center portion of the light housing. The width of the light apertures may increase from the top to the bottom of the light housing or decrease along the same gradient. At least one lens may be disposed on the filter in order to modulate, amplify or direct the light generated by the light source.

Another embodiment includes a set of lighted mirrors having a single light aperture disposed in the lower portion of the front mirror housing. The light source is adapted to extend through the light aperture and may be covered by a lens. The controls for the night light may be disposed in the mirror. Physical buttons may be incorporated into the mirror, or a portion of the mirror may be a touch screen. The light may be adapted to turn on when the light source is pressed by a user.

Another embodiment includes shows a set of lighted mirrors having a single light source disposed in the front mirror housing. The light source may be disposed in a pivotable light housing. The pivotable light housing may be directed to shine the light in a given direction. The pivotable light housing may be controlled by the controller. The light source may be disposed in a recessed surface. A plastic window may cover the light source.

In some exemplary embodiments, the lighted mirror may include additional light sources disposed along the mirror housing. The light sources may be on the left and/or right sides of the mirror, above the mirror or along the back housing. The mirror housing may have a perimeter having a given width. The perimeter may be curved and extend from the back mirror housing to the front mirror housing. The light housing and the light sources may be disposed at any location around the perimeter.

In some exemplary embodiments, the lighted mirror may include a fan. The fan may be detachable and/or configured to attach at any location around the mirror housing. A fan housing may be integrated into the mirror housing. The fan housing may extend through the mirror housing from the front mirror housing to the back mirror housing. A light source may be disposed in at least one fan blade of the fan.

In some exemplary embodiments, the light housing may extend below the perimeter of the front mirror housing. The light housing may extend in front of the front mirror housing. The light housing may have an overhang that helps to direct the light generated by the light source. Side ledges may be disposed along the light housing or light source in order to direct the light. Reflective surfaces may be attached or integrated into the light housing, the overhang or the side ledges.

In some exemplary embodiments, the lighted mirror may include an extended portion. The extended portion may extend out and away from the mirror housing. The main light source or additional complementary light sources may be disposed in the extended portion. The extended portion may extend from any surface of the lighted mirror and/or from any angle out and away from the mirror. The extended portion may include an adjustable stem for positioning a light source.

In some exemplary embodiments, the lighted mirror may include a companion light that may be affixed to any surface in the vehicle. The companion light may have a docking station on the mirror housing. The light sources disposed on the companion light and the mirror housing may be coordinated in order to optimize the lighting in the vehicle for viewing the child secured in the vehicle seat.

As employed in this specification and annexed drawings, the term "or" is intended to mean an inclusive "or" rather than an exclusive "or." Moreover, articles "a" and "an" as used in the subject specification and annexed drawings should generally be construed to mean "one or more" unless specified otherwise or clear from context to be directed to a singular form.

What has been described above includes examples that provide advantages of the subject disclosure. It is, of course, not possible to describe every conceivable combination of components or methodologies for purposes of describing the subject disclosure, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The illustrations and examples provided herein are for explanatory purposes and are not intended to limit the scope of the appended claims. It will be recognized by those skilled in the art that changes or modifications may be made to the above described embodiment without departing from the broad inventive concepts of the invention. It is understood therefore that the invention is not limited to the particular embodiments described herein but is intended to cover all modifications and changes within the scope and spirit of the invention.

What is claimed:

1. A lighted mirror in a vehicle, comprising:
   a mirror housing containing a mirror;
   a light housing disposed in the mirror housing and containing a light source, wherein the light housing directs light below a central axis of the mirror; and
   an attachment assembly for securing the lighted mirror to a headrest in a vehicle, wherein the attachment assembly includes a panel having a post, which mates with a recess in the mirror housing, and wherein the attachment assembly includes adjustable straps connected to the panel.

2. The lighted mirror of claim 1, wherein the light housing is positioned on a bottom side of the mirror housing and directs the light source to illuminate a child in a car seat.

3. The lighted mirror of claim 2, wherein the light source is positioned on a tubular light package.

4. The lighted mirror of claim 3, wherein the tubular light package has at least one pivot hinge that allows the tubular light package to rotate.

5. The lighted mirror of claim 4, wherein the pivot hinge mates with a complementary recess in the light housing.

6. The lighted mirror of claim 4, wherein the tubular light package includes a plurality of light sources.

7. The lighted mirror of claim 6, wherein the tubular light package has a removable lens which covers the plurality of light sources.

8. A lighted mirror in a vehicle, comprising:
   a mirror housing containing a mirror;
   a light housing disposed at a bottom portion of the mirror housing and containing a light source, wherein the light housing directs the light source angularly downward such that any light would be emitted below a center point of reflection of the mirror; and
   an attachment assembly for securing the lighted mirror to a headrest in a vehicle, wherein the light source is positioned on a tubular light package.

9. The lighted mirror of claim 8, wherein the tubular light package has at least one pivot hinge that allows the tubular light package to rotate.

10. The lighted mirror of claim 9, wherein the pivot hinge mates with a complementary recess in the light housing.

11. The lighted mirror of claim 9, wherein the tubular light package includes a plurality of light sources.

12. The lighted mirror of claim 11, wherein the tubular light package has a removable lens which covers the plurality of light sources.

13. The lighted mirror of claim 8, wherein the attachment assembly includes a panel having a post, which mates with a recess in the mirror housing.

14. The lighted mirror of claim 13, wherein the attachment assembly includes adjustable straps connected to the panel.

15. A lighted mirror in a vehicle, comprising:
a mirror housing containing a mirror;
a light housing disposed at a bottom portion of the mirror housing and containing a light source, wherein the light housing directs light below a central axis of the mirror such that any light would be emitted below a center point of reflection of the mirror; and
an attachment assembly for securing the lighted mirror to a headrest in a vehicle, the attachment assembly having a panel with a post, which mates with a recess in the mirror housing, and further including adjustable straps connected to the panel.

16. The lighted mirror of claim 15, wherein the light source is positioned on a tubular light package.

17. The lighted mirror of claim 16, wherein the tubular light package has at least one pivot hinge that allows the tubular light package to rotate.

* * * * *